United States Patent
Wilson et al.

(10) Patent No.: US 12,051,190 B2
(45) Date of Patent: Jul. 30, 2024

(54) QUALITY DEFECT MARKING SYSTEMS AND METHODS IN PACKAGING PRODUCT MANUFACTURING

(71) Applicant: GEORGIA-PACIFIC CORRUGATED LLC, Atlanta, GA (US)

(72) Inventors: Keri A. Wilson, Atlanta, GA (US); Michael T. Payne, Sandy Springs, GA (US)

(73) Assignee: GEORGIA-PACIFIC CORRUGATED LLC

( * ) Notice: Subject to any disclaimer, the term of this patent is extended or adjusted under 35 U.S.C. 154(b) by 429 days.

(21) Appl. No.: 17/313,220

(22) Filed: May 6, 2021

(65) Prior Publication Data

US 2021/0383521 A1   Dec. 9, 2021

Related U.S. Application Data

(60) Provisional application No. 63/036,140, filed on Jun. 8, 2020.

(51) Int. Cl.
*G06T 7/00* (2017.01)
(52) U.S. Cl.
CPC .................... *G06T 7/001* (2013.01)
(58) Field of Classification Search
CPC ....... G06T 7/001; B65B 57/00; B65B 63/005; B65B 61/26
See application file for complete search history.

(56) References Cited

U.S. PATENT DOCUMENTS

| | | | |
|---|---|---|---|
| 3,553,570 | A | 1/1971 | Skubiak |
| 5,705,020 | A | 1/1998 | Chiari |
| 8,073,239 | B1 | 12/2011 | Bahrami |
| 8,890,533 | B2 | 11/2014 | Lim |
| 9,517,912 | B2 | 12/2016 | Brizzi |

(Continued)

FOREIGN PATENT DOCUMENTS

CN   210059038 U  *  2/2020

OTHER PUBLICATIONS

Manders, "Inspection system boxes clever", Vision System Design, Retrieved from Internet URL : https://www.vision-systems.com/factory/article/16736005/inspection-system-boxes-clever, Jun. 4, 2021, 17 Pages.

*Primary Examiner* — Samir A Ahmed

(57) ABSTRACT

Systems and methods for detecting and marking quality defects on individual packaging products being processed through converting machines at high speeds are provided. An example system comprises a controller in communication with a first and second sensor as well as a first and second marker. The first and second sensors sense data corresponding to a first type and second type, respectively, of potential defects in the manufacture of the packaging product, enabling detection of a first- and second-type defect. The controller may be configured to trigger a first marker to mark the individual packaging product with a first mark for the first-type defect; and to trigger a second marker to mark the packaging product with a second mark for the second-type defect. Thus, the type of defects detected on an individual packaging product may be readily indicated on the individual packaging product itself.

21 Claims, 11 Drawing Sheets

(56) References Cited

U.S. PATENT DOCUMENTS

| | | |
|---|---|---|
| 10,525,653 B2 | 1/2020 | Adami |
| 2006/0011134 A1* | 1/2006 | Wain .................. G01N 21/8922 118/668 |
| 2014/0353118 A1* | 12/2014 | Brizzi .................... B65H 33/14 198/418.5 |
| 2015/0104563 A1* | 4/2015 | Lowe ..................... G01B 11/22 250/341.1 |
| 2017/0323400 A1* | 11/2017 | Widner .................. G06Q 50/04 |
| 2017/0348940 A1 | 12/2017 | Amoros et al. |
| 2018/0079162 A1* | 3/2018 | Adami .................. B31F 1/2822 |
| 2019/0016081 A1 | 1/2019 | Widner |
| 2019/0018628 A1* | 1/2019 | Sloan, IV ............. G06F 3/1215 |
| 2020/0198143 A1 | 6/2020 | Hill |
| 2020/0198280 A1 | 6/2020 | Hill |
| 2020/0198281 A1 | 6/2020 | Hill |

* cited by examiner

QUALITY DEFECT MARKING SYSTEMS AND METHODS IN PACKAGING PRODUCT MANUFACTURING

RELATED APPLICATIONS

The present application claims priority to US Provisional Application No. 63/036,140 filed Jun. 8, 2020 which is incorporated herein by reference in its entirety.

BACKGROUND

In packaging product manufacturing, various converting machines are configured to feed corrugated cut sheet stock through various processing steps at rates of more than 200 per minute to output packaging (e.g., boxes, box blanks) at custom sizes and specifications. The converting machines may include processing steps that bundle and bind the finished packaging products for convenient shipping. High-speed sensors may be used throughout the processing steps to detect features on a packaging product that fall outside quality standard ranges. Because of the high output rates and limited access to spaces in which the processing steps are performed, it is difficult to remove any single packaging product having a detected defect from the processing line of the converting machine.

BRIEF SUMMARY

Example embodiments of the present disclosure generally relate to quality defect marking and, more particularly to specific defect marking on individual packaging products in high-speed environments.

Due to the high output rates, often, the first chance to access defective packaging products in the processing line is after they have been bundled. A bundle which contains a packaging product having a detected quality defect may be marked to indicate the bundle as a bad batch. However, it is difficult for operators to quickly find an individual packaging product with a defective feature to remove from the batch, especially where there are multiple features per packaging product and many possible defects for each feature to inspect. Moreover, detecting and classifying defects among a large number of packaging products is susceptible to human subjectivity and error (e.g., false positive, false negative, omission), possibly creating inconsistencies and inefficiencies. Further, removing an entire batch because of one packaging product with a quality defect may be wasteful, costly, and/or inefficient.

Some embodiments of the present disclosure are directed to systems and methods for marking specific defects on an individual packaging product (e.g., corrugated box and/or box blank) while travelling through the various process steps within converting machines (e.g., flexo-folder-gluer, rotary die cutter) along a processing pathway. In this way, operators may easily check the markings on individual packaging products to quickly remove a defective packaging product from a bundle for recycling without having to inspect each packaging product in detail and/or manually compare each packaging product to a standard. Moreover, marking packaging products with the specific defect (e.g., misfold, improper gap width, improper slot depth) may alert the operator that the converting machine needs to be recalibrated and/or that the run parameters should be adjusted, especially where multiple sequential or nearly sequential packaging products have the same type of defect marked. Thus, the operator may be directed to the specific process step within the processing pathway of the converting machines that may need recalibrating, thereby saving time and/or avoiding loss of further packaging products.

In some embodiments, the defect marking may include unique codes for each defect and/or combination of multiple defects. The marking may be performed by high-speed sprayers (e.g., marking valve) or any other marker unit or apparatus able to mark the packaging product (e.g., printer, laser, stamp, projector, electrostatic device, cutter, needle). In some embodiments, the marking apparatus may be non-destructive to the packaging product. In some embodiments, the marking apparatus may be destructive. For example, the marking apparatus may punch holes or cut the edges in a portion of the packaging product, which may be not visible or nearly invisible when the packaging product is assembled or erected.

The systems and methods disclosed herein for marking quality defects may include sprayers as markers that are configured to mark (e.g., spray) the packaging product. In some embodiments, the marking material (e.g., spray, ink, dye, pigment, colorant) may include fluorescing or other special property additives for easily identifying the mark. In some embodiments, the marking material (e.g., spray) may be clear or otherwise invisible under light within the visible spectrum, but may fluoresce under certain conditions or otherwise be identifiable using specialty equipment, sensors, and/or cameras. For example, the marking material (e.g., spray) may include UV additives that become visible when exposed to UV light. In this way, the packaging products may be marked without any visible trace that may be apparent to customers.

Those packaging products with features falling outside of predetermined quality standard ranges may then be removed or otherwise diverted from the processing pathway.

Some embodiments of the present disclosure provide example quality defect marking system designs for quickly detecting and uniquely coding single packaging products with indications of a defect type in a high-speed manufacturing environment, thus enabling identification of both the individual defective packaging product in the bundle and its corresponding specific defect(s). In this way, the defective packaging product may be removed from the processing pathway and/or the run parameters for the converting machine may be adjusted accordingly. For example, various quality defect marking systems and methods described herein are designed to mark a packaging product using one or more defect sprayers (though other manners of marking are contemplated). In some embodiments, such quality defect marking systems and methods may utilize UV marking material (e.g., spray) in the defect markers (e.g., sprayers) and UV lights in the sensors, although embodiments of the present disclosure are not meant to be limited to such a design. In this regard, notably, embodiments of the present disclosure provide quality defect marking systems and methods with various features (e.g., markers and sensors in various configurations along a processing pathway) that are designed to aid in defect issue spotting, while still providing for the high speeds of converting machines.

To achieve such a goal, some embodiments of the present disclosure provide sensors and markers in connection with a controller along a processing pathway of a converting machine. One or more of the sensors may be high-speed cameras (e.g., "photoeyes") for capturing measurements of various features of the packaging product. Further, the defect markers (e.g., defect sprayers) may be positioned in an array that enables a single activation at a high throughput, where specific markers in the array may be activated depending on the detected defect in order to create the unique code or mark.

Various additional features, such as multiple sensor and marker types, mark readers, and automatic rejection, among others described herein, are contemplated for some embodiments, and may aid in saving time and costs within the manufacturing environment.

BRIEF DESCRIPTION OF THE DRAWINGS

Figure 1:
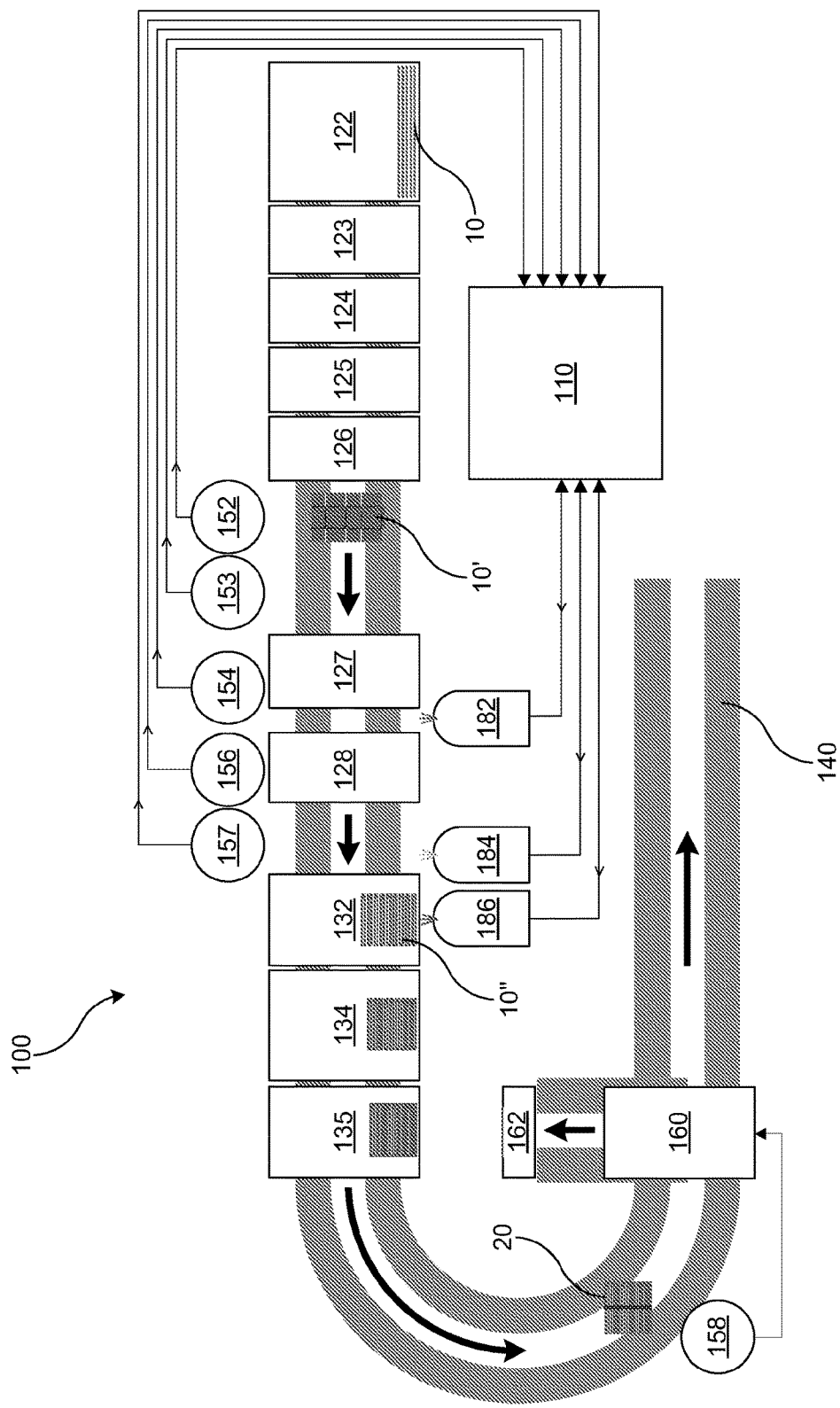
Figure 2:
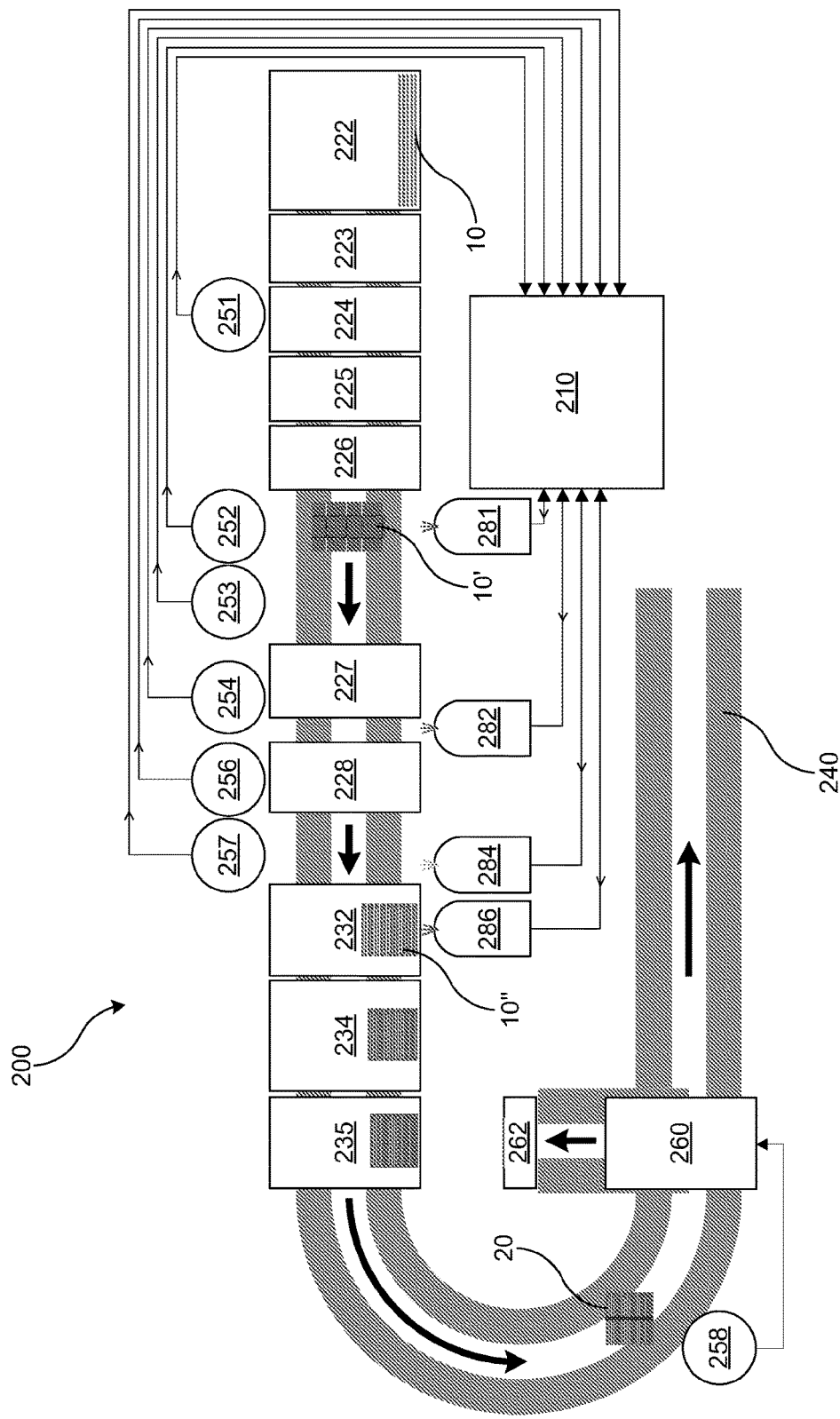
Figure 3:
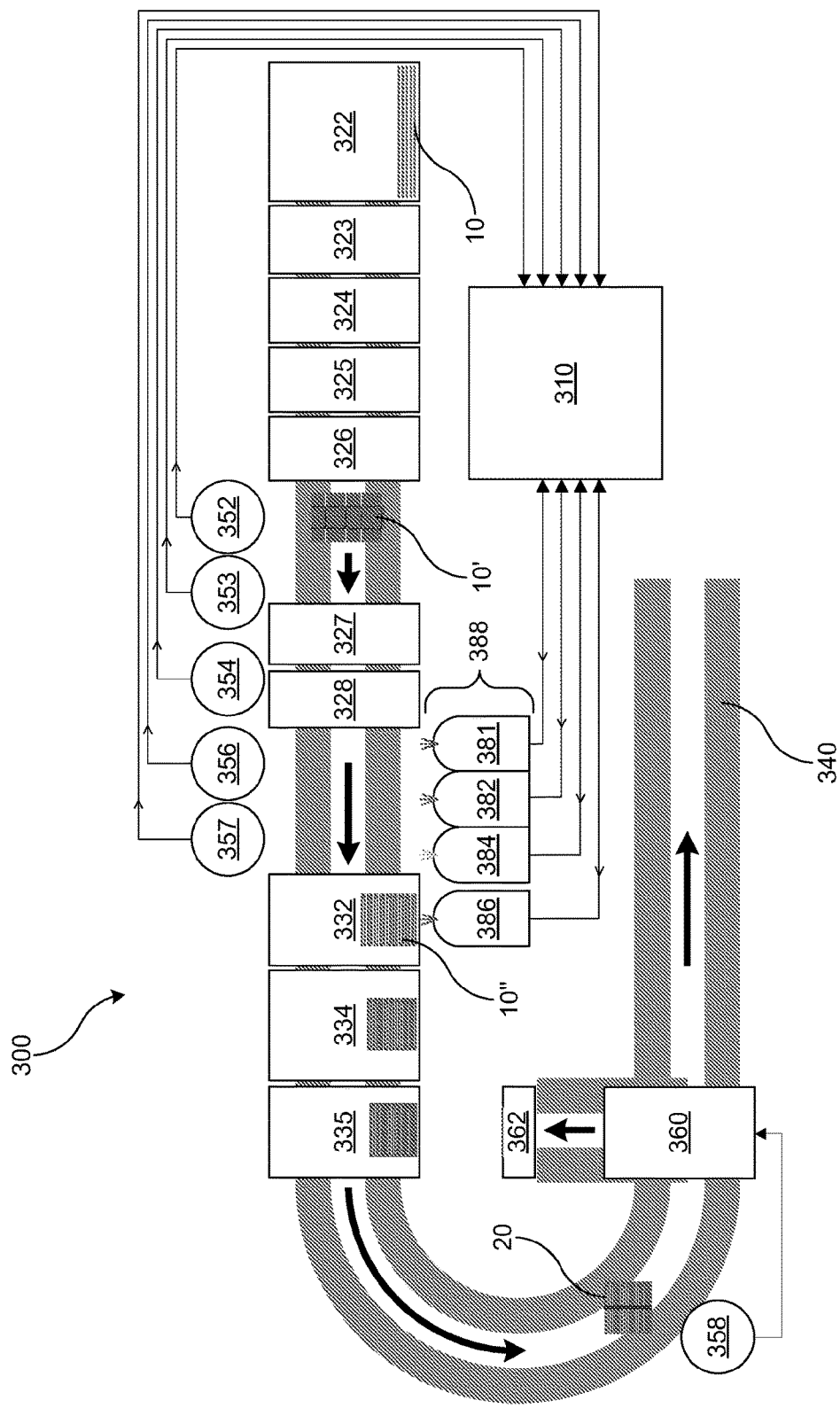
Figure 4:
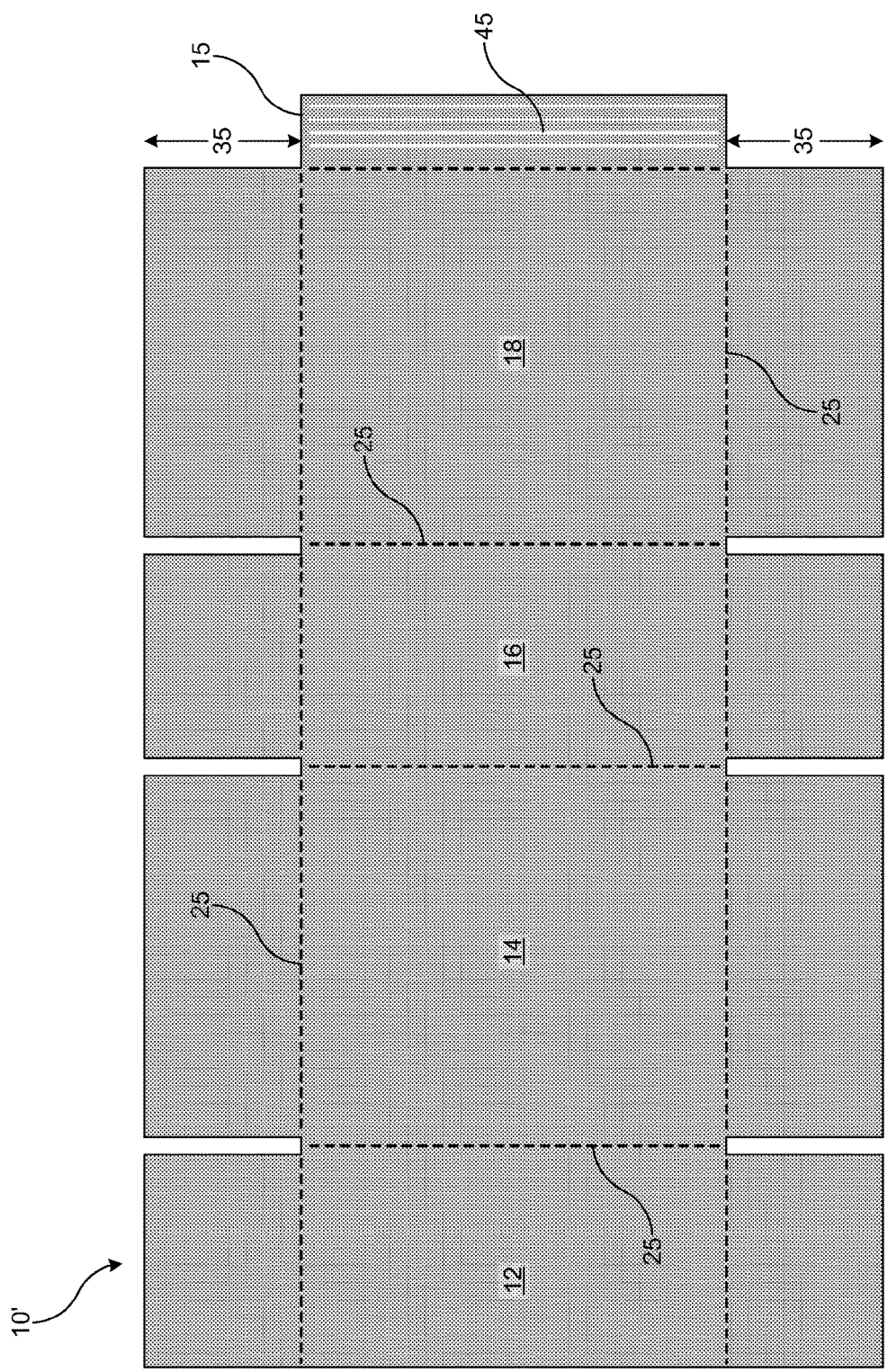
Figure 5:
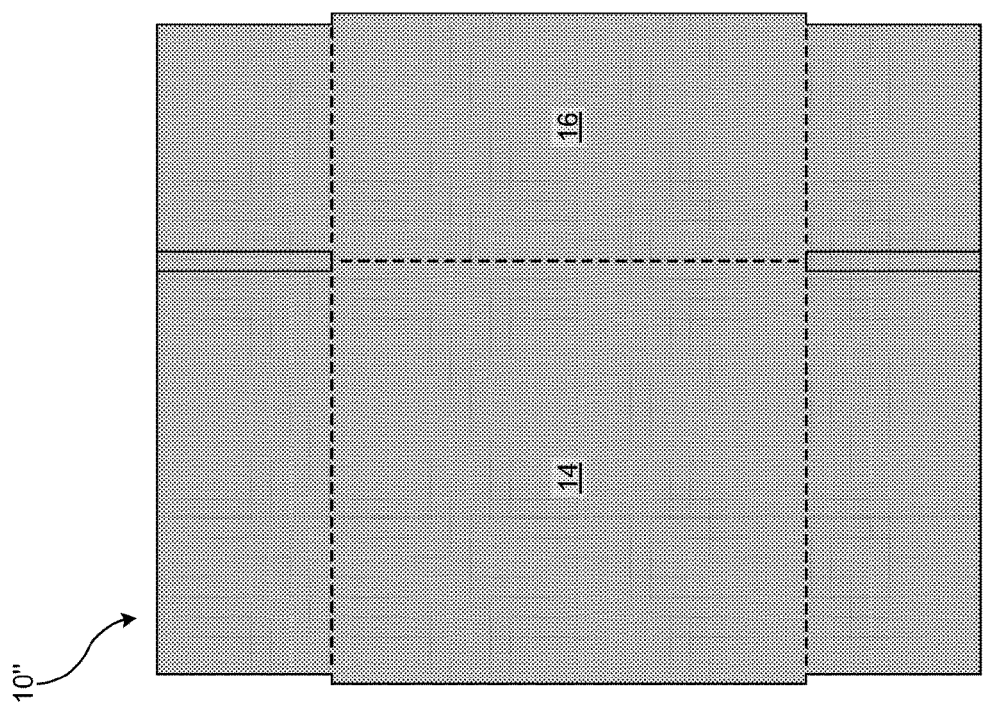
Figure 6:
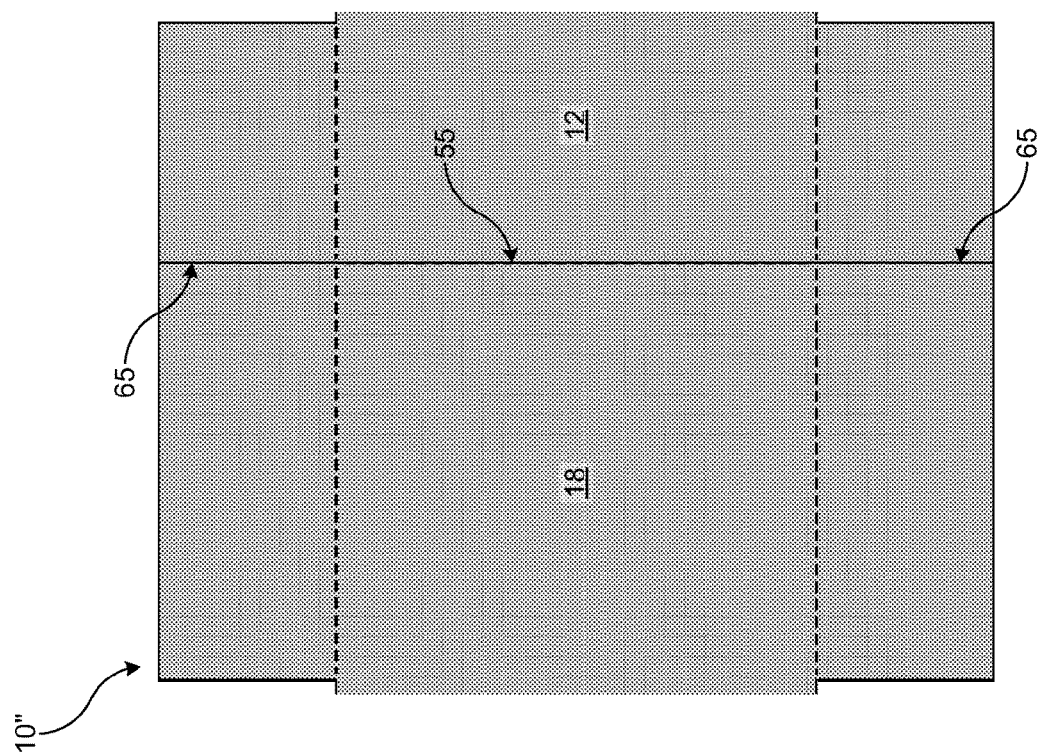
Figure 7:
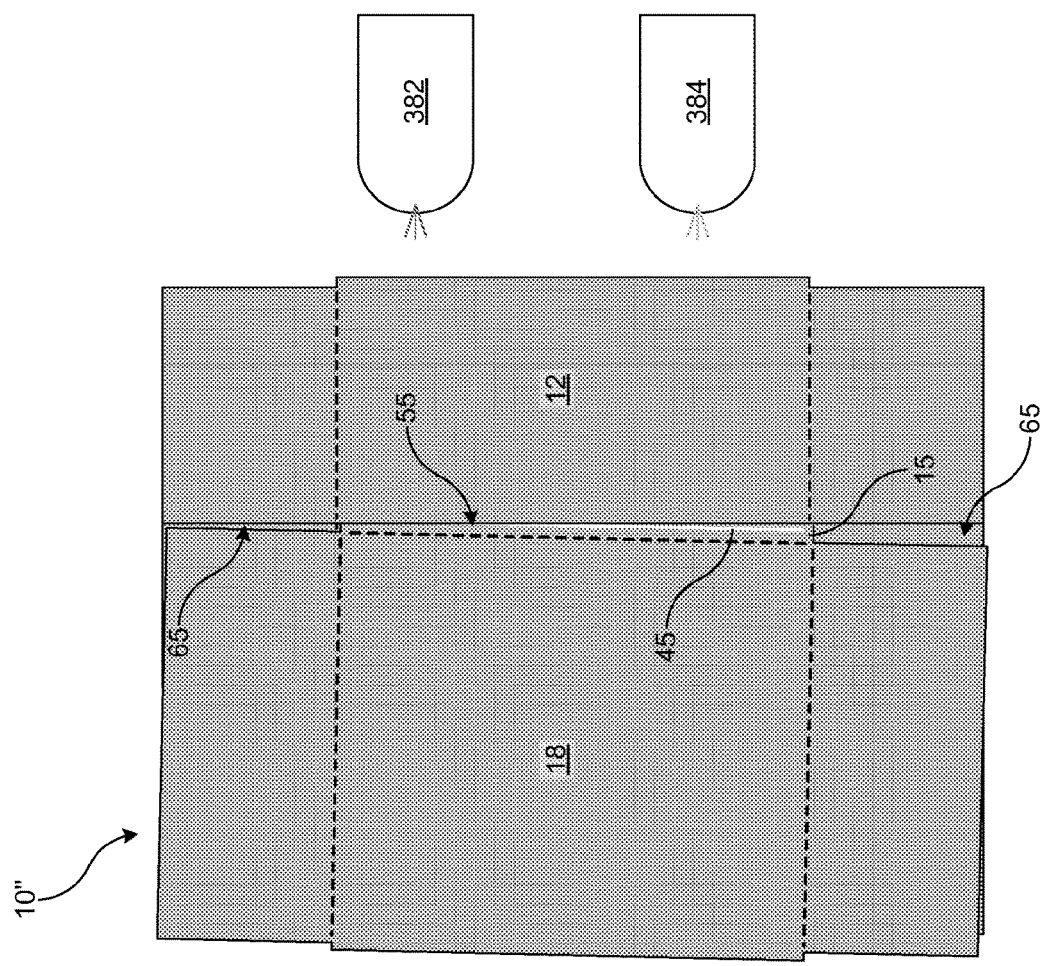
Figure 8:
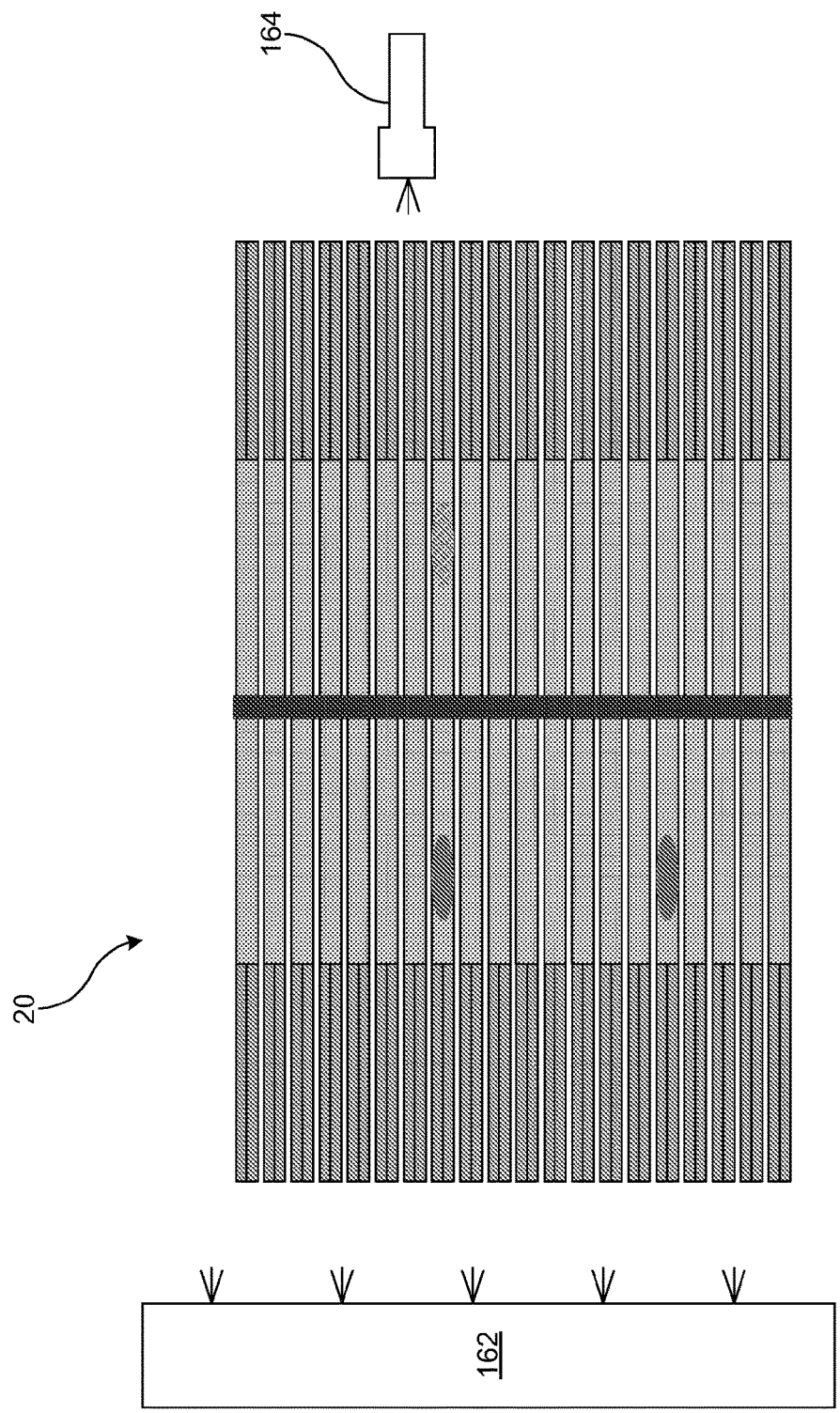
Figure 9:
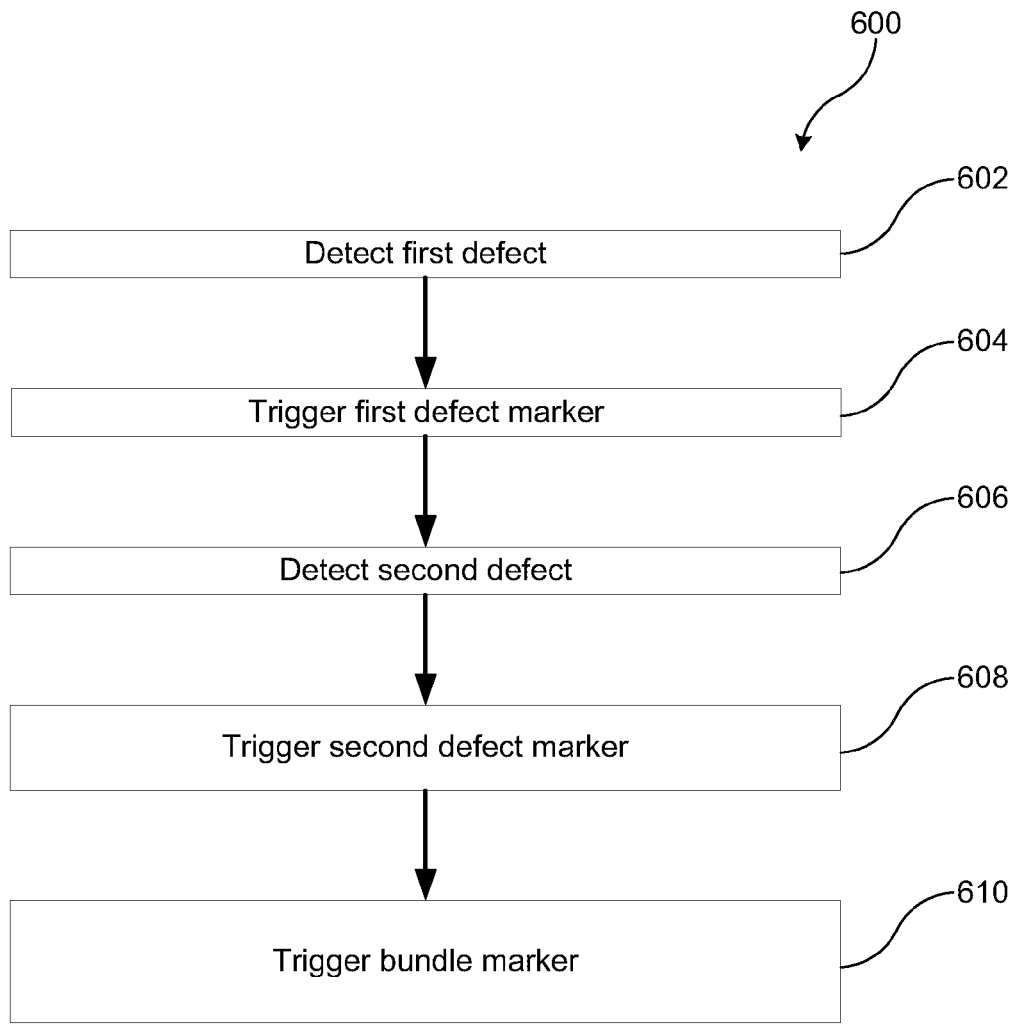
Figure 10:
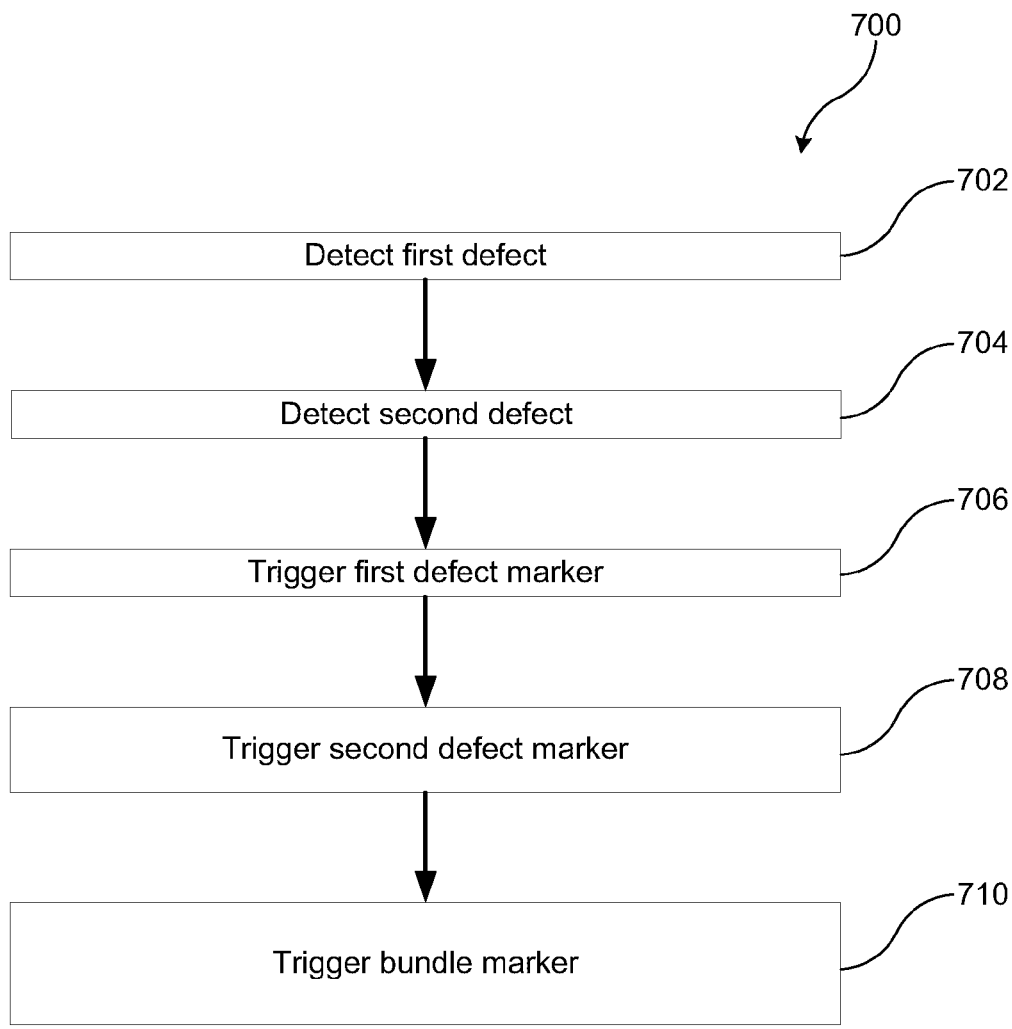
Figure 11:
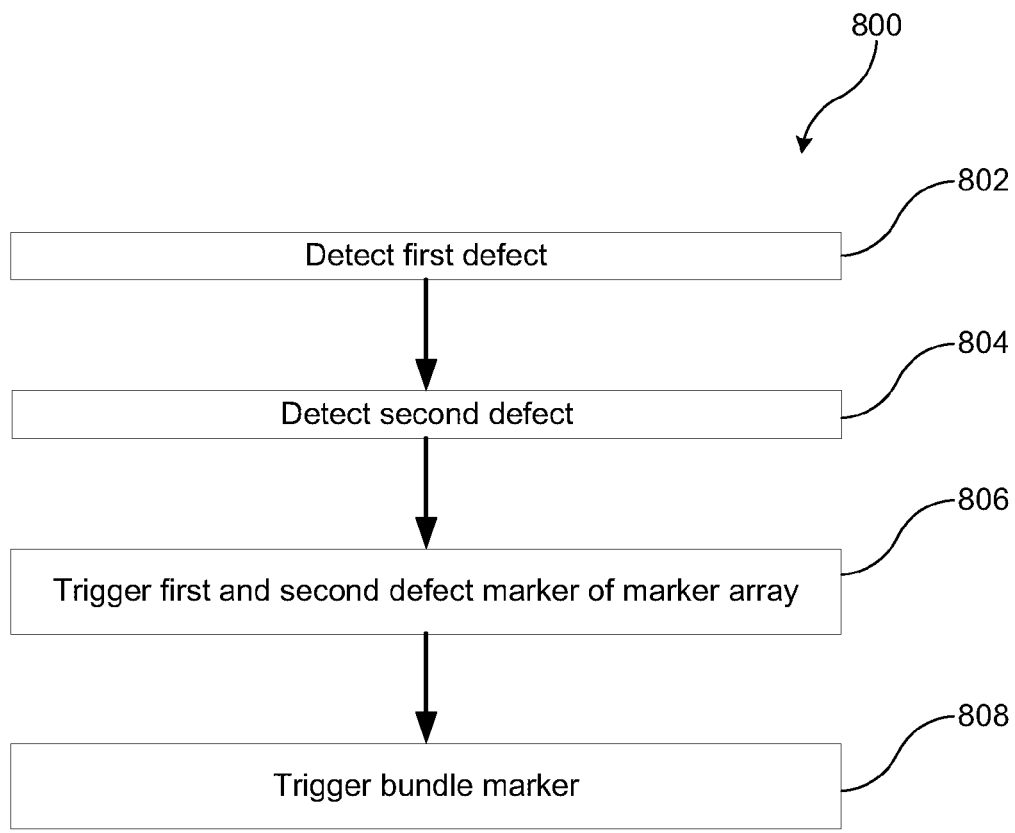

Having thus described the disclosure in general terms, reference will now be made to the accompanying drawings, which are not necessarily drawn to scale, and wherein:

FIG. 1 is a diagram of an example quality defect marking system along a processing pathway within a converting machine environment, in accordance with some embodiments discussed herein;

FIG. 2 is a diagram of another example quality defect marking system including sensors and defect markers (e.g., sprayers), in accordance with some embodiments discussed herein;

FIG. 3 is a diagram of another example quality defect marking system including a defect marker array (e.g., sprayer array), in accordance with some embodiments discussed herein;

FIG. 4 is an illustration of a top plan view of an example box blank with features sensed by the quality defect marking system, in accordance with some embodiments discussed herein;

FIG. 5 is an illustration of a top plan view of an example folded and joined box formed from the box blank shown in FIG. 4, in accordance with some embodiments discussed herein;

FIG. 6 is an illustration of a bottom plan view of the example folded and joined box shown in FIG. 5, in accordance with some embodiments discussed herein;

FIG. 7 is an illustration of a bottom plan view of an example misfolded and joined box formed from the box blank shown in FIG. 4 along with defect markers (e.g., sprayers) from the example system of FIG. 3 marking (e.g., spraying) the box due to detected defects, in accordance with some embodiments discussed herein;

FIG. 8 is an illustration of a side elevational view of an example bundle of stacked boxes including the defective box shown in FIG. 7 along with a UV light from the example system of FIG. 1 causing markings on the boxes of the bundle to fluoresce, in accordance with some embodiments discussed herein;

FIG. 9 illustrates a flowchart of an example method of detecting and marking quality defects using the example system of FIG. 1, in accordance with some embodiments discussed herein;

FIG. 10 illustrates a flowchart of another example method of detecting and marking quality defects using the example system of FIG. 2, in accordance with some embodiments discussed herein; and FIG. 11 illustrates a flowchart of another example method of detecting and marking quality defects using the example system of FIG. 3, in accordance with some embodiments discussed herein.

DETAILED DESCRIPTION OF THE PREFERRED EMBODIMENTS

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

Notably, while some embodiments describe various positional qualifiers for various features, such as "top", "bottom", "above", "below", "downstream", "under", "side", etc., embodiments described herein are not meant to be limited to such qualifiers unless otherwise stated. The directional qualifiers herein are generally used to aid in describing the disclosure in the context of the drawings and/or description but are not otherwise intended to be limiting.

While some embodiments describe an "operator", use of such a term herein is not meant to be limited to a person or a single person, as the "operator" may be a manufacturer or other type of user along a supply chain in relation to manufacturing the packaging products. Further, when utilizing the word "operator", the actor(s) may be operating one or more machines/systems that cause the intended function (e.g., removing the packaging product from the processing pathway, identifying marks).

Various example embodiments of the present disclosure provide quality defect marking systems and methods for quickly and effectively indicating whether a packaging product (e.g., corrugated cut sheet 10, box blank 10', folded and glued box blank 10") includes a quality defect, and, if so, which type of defect. Notably, the quality standards for the different packaging products run through converting machines may vary. Accordingly, the definition of a quality defect may vary based on the acceptable ranges predetermined by each packaging product manufactured and/or the customer options corresponding to a particular packaging product design.

The disclosed methods and systems may include a first sensor for sensing data corresponding to a first type of potential defect in the processing of the packaging product and a second sensor for sensing data corresponding to a second type of potential defect in the processing of the packaging product. The data corresponding to the first and second types of potential defects may include, for example, a score measurement, a slot depth measurement, a glue measurement, a fold measurement, and/or a gap measurement. The data from the first and second sensors may be processed by a controller, which is configured to detect whether a first-type defect and/or a second-type defect is present based on the respective data. The first-type and second-type defects may be, for example, an improper score, an improper slot depth, improper gluing, a misfold, and/or an improper gap.

An example quality defect marking system 100 that accomplishes such advantages is shown in FIG. 1. The system 100 may include a controller 110, as well as various sensors and markers (e.g., sprayers) configured throughout a converting machine along a processing pathway 140 (e.g., conveyor(s), transfer device(s)). The converting machine may be a flexo-folder-gluer, although other converting machinery is contemplated (e.g., rotary die cutter). The flexo-folder-gluer may include a corrugated cut sheet stack feeder 122 (e.g., for feeding cut sheet stock into the converting machine), a printer 123 (e.g., for printing on one or both sides of the corrugated cut sheets 10), a slotter 124 (e.g., for scoring and/or forming slots in the corrugated cut sheets 10), a die-cutter 125 (e.g., for cutting the cut sheets 10 into box blanks 10'), and/or a scrubber 126 (e.g., for separating the cut corrugated sheet scrap material from the box blanks 10').

After and/or while the printed and cut box blanks 10' exit through the scrubber 126, the system 100 may scan the box blanks 10' for defects using a score sensor 152 and/or a slot depth sensor 153. In some embodiments, the score sensor 152 may include an optical camera and light to capture images of the score lines formed on the box blanks 10'. The image of the score lines for each box blank 10' may be processed by the controller 110 (e.g., compared pixel-by-pixel to a standard) to determine whether the score lines fall outside of a predetermined acceptable variance in order to detect score-type defects. Likewise, in some embodiments, the slot depth sensor 153 may include an optical camera and light to capture images of the slots formed in the box blanks 10'. The image of the slots for each box blank 10' may be processed by the controller 110 (e.g., compared pixel-by-pixel to a standard) to determine whether the slots fall outside of a predetermined acceptable variance (e.g., optimal slot depth±tolerance) in order to detect slot-type defects.

As shown in FIG. 1, the box blanks 10' may continue along the processing pathway 140 to a gluer 127, where glue (e.g., hot melt adhesive) may be applied, such as to a flap (e.g., side flap 15 in FIG. 4) for joining to a side (e.g., panel 12 in FIG. 4). After the glue is applied, the system 100 may scan the box blanks 10' for defects using a glue sensor 154. In some embodiments, the glue sensor 154 may include an optical camera and light to capture images of the glue applied to the flaps of the box blanks 10'. The image of the glue for each box blank 10' may be processed by the controller 110 (e.g., compared pixel-by-pixel to a standard) to determine whether the gluing falls outside of a predetermined acceptable variance in order to detect glue-type defects. In some embodiments, the glue may include an ultraviolet (UV) additive, and the glue sensor 154 may include a UV light projector for easily identifying glue positions. The glue or other adhesive may dry or cure clear.

In some embodiments, the system 100 may include a first defect marker (e.g., sprayer 182) positioned downstream from the gluer 127. In response to detecting a glue-type defect, the controller 110 may trigger the first defect marker (e.g., sprayer 182) to mark (e.g., spray) the packaging product having the detected glue-type defect.

In some embodiments, the marking material (e.g., spray, ink, dye, pigment, colorant) from the marker (e.g., first defect sprayer 182, second defect sprayer 184) may include fluorescing or other special property additives for easily identifying the mark. In some embodiments, the marking material (e.g., spray) may be clear or otherwise invisible under light within the visible spectrum (for the human eye), but may fluoresce under certain conditions or otherwise be identifiable using specialty equipment, sensors, and/or cameras. For example, the marking material (e.g., spray) may include UV additives that become visible when exposed to UV light. In this way, the packaging products may be marked without any visible trace that may be apparent to customers/end users.

The system 100 and/or controller 110 may include a tracking encoder for tracking each packaging product along the processing pathway 140. The tracking encoder may be in communication with a real-time inventory management system for helping to track the location of any individual packaging product along the processing pathway 140 at high speeds (e.g., ranging from about 200 to about 600 boxes per minute). In this way, when the controller 110 detects a defect in a box blank 10' via a sensor (e.g., the glue sensor 154), the system 100 can trigger a marker (e.g., the first defect sprayer 182) to mark the same box blank 10' with the defect at a position downstream from the sensor. For example, in some embodiments, the controller 110 may be configured to generate or determine a trigger time for when to trigger the first defect marker (e.g., sprayer 182) calculated based on the time when the system 100 scanned the box blank 10' via the glue sensor 154, such that when the first defect marker (e.g., sprayer 182) marks (e.g., sprays) at the calculated trigger time the same scanned box blank 10' in which the glue-type defect was detected will be marked (e.g., sprayed) by the first defect marker (e.g., sprayer 182). Alternatively, in some embodiments, the controller 110 may be configured to generate the time to trigger the first defect marker (e.g., sprayer 182) based on when the image from the glue sensor 154 was received by the controller 110. In this regard, in some embodiments, the system 100 may be configured to operate according to a known throughput time for a packaging product, such that the position of the packaging product along the processing pathway 140 can be known.

With continued reference to FIG. 1, the box blanks 10' may exit the gluer 127 and then travel along the processing pathway 140 to a folder-joiner 128. The folder-joiner 128 may fold the glued box blanks 10' along the score lines to join the glued flap (e.g., the side flap 15) to a side (e.g., the panel 12) to form each box blank 10' into a flat tubular folded and glued box blank 10". After and/or while the folded and glued box blanks 10" exit through the folder-joiner 128, the system 100 may scan the folded and glued box blanks 10" for defects using a misfold sensor 156 and/or a gap sensor 157.

In some embodiments, the misfold sensor 156 may include an optical camera and light to capture images of the fold formed from the flap being joined to the side of each folded and glued box blank 10". The image of the fold for each folded and glued box blank 10" may be processed by the controller 110 (e.g., compared pixel-by-pixel to a standard) to determine whether the joining at the fold falls outside of a predetermined acceptable variance in order to detect fold-type defects. For example, the light of the misfold sensor 156 may illuminate the fold region of the folded and glued box blank 10" at a certain angle to both illuminate and create shadows within the field-of-view of the camera. Based on the relative positions of the edge of the fold (e.g., the edge of panel 12 as shown and described with reference to FIG. 7) and the score line of the flap (e.g., side flap 15), shadows may be cast indicating the width between the fold edge and the score line and whether the width changes (e.g., the fold edge and score line are not parallel). The controller 110 may process the image to determine whether the indicated width is too wide and/or too narrow. Moreover, if the flap has been folded on the wrong side of the joining panel, the controller 110 may quickly detect the misalignment of the shadows. In some embodiments, the misfold sensor 156 may include a UV light, and the glue may include a UV additive, such that misfolds may be easily detected where a portion of the UV glue can be seen in the captured image fluorescing outside of the fold.

In some embodiments, the gap sensor 157 may include a camera and a laser light projection (e.g., laser line probe) to measure the gap formed between the sides of the folded and glued box blank 10" due to the joining. The image of the gap for each folded and glued box blank 10" may be processed by the controller 110 (e.g., compared pixel-by-pixel to a standard or converted to distance measurement data set) to determine whether the formed gap falls outside of a predetermined acceptable variance (e.g., optimal gap depth±tolerance), such as along multiple points, in order to detect gap-type defects. Similar to the misfold sensor 156, the gap sensor 157 may project a laser light (e.g., with a line or other pattern) onto the gap formed by joining the sides of the folded and glued box blank 10". The three-dimensional height differences created by the thickness of the corrugate material of the folded and glued box blank 10" may cause disruptions or distortions to the line or pattern of the laser that are captured by the camera. The controller 110 may analyze the image of the laser pattern distortions to determine whether the width of the gap is too narrow and/or too wide. In some embodiments, the gap sensor 157 may capture images indicating width at multiple locations along the gap for each folded and glued box blank 10" (e.g., via a projected laser pattern spanning the gap at multiple points). In this way, the parallel alignment of the join of the folded and glued box blank 10" may also be analyzed.

In some embodiments, the misfold sensor 156 and/or gap sensor 157 may additionally or alternatively include a UV light and photosensor to capture images of any glue positioned outside of the side and/or flap of the folded and glued box blank 10" due to the joining process. The controller 110 may process the image data to determine whether the amount of glue detected falls outside of a predetermined acceptable variance in order to detect fold-type defects.

In some embodiments, the system 100 may include a second defect marker (e.g., sprayer 184) positioned downstream from the folder-joiner 128. In response to detecting a fold-type and/or gap-type defect, the controller 110 may trigger the second defect marker (e.g., sprayer 184) to mark (e.g., spray) the packaging product having the detected fold-type and/or gap-type defect.

In some embodiments, the system 100 may be further configured to trigger the second defect marker (e.g., sprayer 184) in response to detecting a score-type and/or slot-type defect based on the scans by the score sensor 152 and/or slot depth sensor 153. Thus, the controller 110 may trigger the second defect marker (e.g., sprayer 184) to mark (e.g., spray) the packaging product having the detected score-type, slot-type, fold-type, and/or gap-type defect.

In some embodiments, the system 100 may be configured to trigger the second defect marker (e.g., sprayer 184) in a different pattern and/or shape based on whether one or more of a score-type, slot-type, fold-type, and/or gap-type defect is detected on a particular packaging product.

As described with reference to the first defect marker (e.g., sprayer 182), the second defect marker (e.g., sprayer 184) may similarly utilize various marking materials (e.g., sprays, ink, dye, pigment, colorant) for marking the packaging product. In some embodiments, the first defect marker (e.g., sprayer 182) may use a first marking material (e.g., blue UV spray/ink), while the second defect marker (e.g., sprayer 184) uses a second marking material (e.g., green UV spray/ink). In this way, marks of the first defect marker (e.g., sprayer 182) may be readily distinguishable from marks of the second defect marker (e.g., sprayer 184). Assigning unique marks to different markers that are triggered by the system in response to distinct defect types advantageously provides operators with the ability to quickly triage the defect(s) in a particular packaging product. For example, blue UV marks may be limited to glue-type defects, whereas green UV marks may identify score-type, slot-type, fold-type, and/or gap-type defects in a packaging product. In some embodiments, the green UV marks may be distinguished from each other using an assigned pattern (e.g., number of dots) to indicate which of the score-type, slot-type, fold-type, and/or gap-type defect the packaging product has.

Some embodiments may include a different marker (e.g., sprayer) for each type of defect sensed by the system. The different markers may each have unique marks (e.g., color, pattern) that they apply to the packaging product. For example, the second defect marker (e.g., sprayer 184) may form a marker array (e.g., sprayer array) such that multiple markers (e.g., sprayers or nozzles) are available to apply different marks or differently positioned marks. In such embodiments, processing times may advantageously be minimized since each marker may receive the same simple signal from the controller to activate, rather than having to interpret how to activate. Likewise, having the marking units (e.g., sprayer nozzles) permanently positioned at the location where they are supposed to mark (e.g., spray) may simplify and speed up the system by not requiring motion. Moreover, programming the marking units (e.g., spray nozzles or other markers) to activate just once based on receiving an activation signal may increase the rate of the system. This may be helpful in use with converting machines with high throughput because the amount of time the individual packaging product is available for marking is limited.

Additionally or alternatively, some embodiments may include markers that are each configured to mark the packaging product with multiple different marks depending on the signal received from the controller.

With further reference to FIG. 1, the folded and glued box blanks 10" may exit the folder-joiner 128 and then travel along the processing pathway 140 to a bundler 132. The bundler 132 may stack the folded and glued box blanks 10" in bundles 20 according to the programmed run parameters for the converting machine. For example, the folded and glued box blanks 10" may be stacked in 25-box bundles for more efficient shipping and handling. After and/or while the folded and glued box blanks 10" are stacked by the bundler 132, the system 100 may trigger a bundle marker (e.g., sprayer 186) to mark the bottom of a bundle 20 based on any of the folded and glued box blanks 10" within the bundle 20 having one or more detected defects (e.g., score-type, slot-type, glue-type, fold-type, and/or gap-type defect). In this way, the system 100 may scan the bottom of a bundle 20 along the processing pathway 140 using a sensor (e.g., bundle sensor 158) and, in response to detecting a bundle mark, may automatically remove the same bundle 20 from the processing pathway 140 using a bundle ejector 160. In some embodiments, the bundle marker (e.g., sprayer 186) may be positioned or configured to mark areas of the bundle 20 additional or alternative to the bottom.

After exiting the bundler 132, the bundle 20 may travel along the processing pathway 140 to a compressor 134, where the stacked folded and glued box blanks 10" are compressed to allow for proper adhesion of the gluing and space-saving. The system 100 may further include a strapper 135, where each compressed stack of flat folded and glued box blanks 10" has a strap applied around the bundle 20 to aid in shipping and handling.

After and/or while the bundles 20 exit through the strapper 135, the system 100 may scan the bundles 20 for a bundle mark using a bundle sensor 158. In some embodiments, the bundle sensor 158 may include an optical camera and UV light to capture images of the bottom of the bundles 20. The image of the bottom for each bundle 20 may be processed by the controller 110 to determine whether a bundle mark has been applied by the bundle marker (e.g., sprayer 186). In response to a detected bundle mark, the controller 110 may trigger the bundle ejector 160 to eject the bundle 20 from the processing pathway 140 (e.g., along an offshoot toward a UV light box 162).

In some embodiments, the bundle sensor 158 may include a UV sensor and/or UV light to sense if the bottoms of any of the bundles 20 have been marked by the bundle marker (e.g., sprayer 186) as the bundles 20 are conveyed along the processing pathway (e.g., to indicate that the bundle contains folded and glued box blanks 10" with one or more detected defects). The UV sensor and/or bundle sensor 158 may be configured to transmit sensing data regarding the bottom of each bundle 20 to the controller 110 to be processed. In some embodiments, the bundle sensor 158 may locally determine whether a bundle mark has been applied to the bottom of the bundle 20. In response to a detected bundle mark, the controller 110 and/or bundle sensor 158 may trigger the bundle ejector 160 to eject the bundle 20 from the processing pathway 140 (e.g., along an offshoot toward a UV light box 162).

In some embodiments, after being ejected by the bundle ejector 160, the ejected bundle 20 may then be examined by an operator using a UV light box 162 and/or a UV flashlight 164, for example. In some embodiments, the UV light box 162 may be movable. The UV light box 162 may provide UV light in an ejection area for the ejected bundles 20 such that any UV marks on the folded and glued box blanks 10" (e.g., made by the first defect sprayer 182 and/or the second defect sprayer 184) may be readily detected by the operator. The operator may then remove any marked folded and glued box blanks 10" from the marked and ejected bundle 20 and return any remaining unmarked folded and glued box blanks 10" to the processing pathway 140 or elsewhere for rebundling. In this way, only the appropriately detected folded and glued box blanks 10" with defects are removed from the processing pathway 140, thereby minimizing waste and saving operator time.

In some embodiments, removal of the marked folded and glued box blanks 10" from the bundles 20 may be automated using mark readers or other technologies. The automation may be supervised or double-checked by operators, such as by using the user interface of the inventory management system.

FIG. 2 shows another example quality defect marking system 200 including a controller 210, as well as various sensors and markers (e.g., sprayers) configured throughout a converting machine along a processing pathway 240 (e.g., conveyor). Similar to the system 100 of FIG. 1, the system 200 may include a corrugated cut sheet stack feeder 222 (e.g., for feeding cut sheet stock into the converting machine), a printer 223 (e.g., for printing on one or both sides of the corrugated cut sheets 10), a slotter 224 (e.g., for scoring and/or forming slots in the corrugated cut sheets 10), a die-cutter 225 (e.g., for cutting the cut sheets 10 into box blanks 10'), a scrubber 226 (e.g., for separating the cut corrugated sheet scrap material from the box blanks 10'), a gluer 227 (e.g., for applying glue to the flaps of the box blanks 10'), a folder-joiner 228 (e.g., for folding and joining the glued flaps of the box blanks 10' to the sides to form flat tubular folded and glued box blanks 10"), a bundler 232 (e.g., for stacking the folded and glued box blanks 10" into bundles 20), a compressor 234 (e.g., for compressing the bundles 20 to shrink the stack and ensure proper adhesion of the glued flaps), a strapper 235 (e.g., for binding the bundles 20 with straps), and/or a bundle ejector 260 (e.g., for ejecting marked bundles from the processing pathway 240).

The system 200 of FIG. 2 may include similar sensors (e.g., a score sensor 252, a slot depth sensor 253, a glue sensor 254, a misfold sensor 256, a gap sensor 257, a bundle sensor 258) and markers (e.g., a first defect sprayer 282, a second defect sprayer 284, a bundle sprayer 286) as those in FIG. 1. Additionally, the system 200 may include a print sensor 251 positioned along the processing pathway 240 downstream from the printer 223. After and/or while the printed corrugated cut sheets 10 exit the printer 223, the system 200 may scan the printed sheets 10 for defects using the print sensor 251. In some embodiments, the print sensor 251 may include an optical camera and light to capture images of the graphics and/or indicia printed on the corrugated cut sheets 10. The image of the printing for each corrugated cut sheet 10 may be processed by the controller 210 (e.g., compared pixel-by-pixel to a standard, analyzed for misaligned registration marks) to determine whether the printing falls outside of a predetermined acceptable variance in order to detect print-type defects.

The system 200 may include a third defect marker (e.g., sprayer 281) located along the processing pathway 240 downstream from the printer 223. In response to detecting a print-type defect, the controller 210 may trigger the third defect marker (e.g., sprayer 281) to mark (e.g., spray) the packaging product having the detected print-type defect.

In some embodiments, the third defect marker (e.g., sprayer 281) may be positioned downstream from the score sensor 252 and/or slot depth sensor 253, and the controller 210 may be configured to trigger the third defect marker (e.g., sprayer 281) to mark (e.g., spray) the packaging product in response to the system 200 detecting a score-type, slot-type, and/or print-type defect.

The third defect marker (e.g., sprayer 281) may use a third marking material (e.g., purple UV spray/ink) that is different from the first and second marking materials (e.g., sprays) used by the first defect marker (e.g., sprayer 282) and second defect marker (e.g., sprayer 284), respectively. In this way, an operator may easily and readily identify the origin of a specific defect on the packaging products marked by any of the three defect markers (e.g., sprayers).

FIG. 3 shows another example quality defect marking system 300 including a controller 310, as well as various sensors and markers (e.g., sprayers) configured throughout a converting machine along a processing pathway 340 (e.g., conveyor). Similar to the system 100 of FIG. 1, the system 300 may include a corrugated cut sheet stack feeder 322 (e.g., for feeding cut sheet stock into the converting machine), a printer 323 (e.g., for printing on one or both sides of the corrugated cut sheets 10), a slotter 324 (e.g., for scoring and/or forming slots in the corrugated cut sheets 10), a die-cutter 325 (e.g., for cutting the cut sheets 10 into box blanks 10'), a scrubber 326 (e.g., for separating the cut corrugated sheet scrap material from the box blanks 10'), a gluer 327 (e.g., for applying glue to the flaps of the box blanks 10'), a folder-joiner 328 (e.g., for folding and joining the glued flaps of the box blanks 10' to the sides to form flat tubular box blanks 10"), a bundler 332 (e.g., for stacking the folded and glued box blanks 10" into bundles 20), a compressor 334 (e.g., for compressing the bundles 20 to shrink the stack and ensure proper adhesion of the glued flaps), a strapper 335 (e.g., for binding the bundles 20 with straps), and/or a bundle ejector 360 (e.g., for ejecting marked bundles from the processing pathway 340).

The system 300 of FIG. 3 may include similar sensors (e.g., a score sensor 352, a slot depth sensor 353, a glue sensor 354, a misfold sensor 356, a gap sensor 357, a bundle sensor 358) and markers (e.g., a bundle sprayer 386) as those in FIG. 1. Additionally, the system 300 may include a defect marker array (e.g., sprayer array 388) positioned along the processing pathway 340 downstream from the folder-joiner 328. After and/or while the folded and glued box blanks 10" exit the folder-joiner 328, the controller 310 may trigger the defect marker array (e.g., sprayer array 388) to mark (e.g., spray) a folded and glued box blank 10" in response to detecting one or more of a score-type, slot-type, glue-type, fold-type, and/or gap-type defect in the folded and glued box blank 10" (e.g., via the score sensor 352, slot depth sensor 353, glue sensor 354, misfold sensor 356, and/or gap sensor 357). In some embodiments, the defect marker array (e.g., sprayer array 388) may include a first defect marker (e.g., sprayer 381), a second defect marker (e.g., sprayer 382), a third defect marker (e.g., sprayer 384), and/or additional markers. Each of the markers in the defect marker array (e.g., sprayer array 388) may be configured to mark the folded and glued box blank 10" having a defect with a unique mark. For example, as depicted in FIG. 3, the first defect marker (e.g., sprayer 381) may use a first marking material (e.g., purple UV spray/ink), the second defect marker (e.g., sprayer 382) may use a second marking material (e.g., blue UV spray/ink), and the third defect marker (e.g., sprayer 384) may use a third marking material (e.g., green UV spray/ink), where the first, second, and third marking materials (e.g., sprays) are all different.

In some embodiments, the controller 310 of the system 300 may be configured to trigger a different marker in the defect marker array (e.g., sprayer array 388) corresponding to a different type of defect (e.g., score-type, slot-type, glue-type, fold-type, and/or gap-type). In some embodiments, the controller 310 may be configured to trigger a combination of different markers (e.g., the first defect sprayer 381 with the third defect sprayer 384) to indicate different types of defects detected.

The defect marker array (e.g., sprayer array 388) may advantageously be aligned within the system 300 to mark (e.g., spray) using each of the marking units (e.g., sprayers) along the same edge of a folded and glued box blank 10" at different locations in order to encode which type of defect has been detected in the marked (e.g., sprayed), folded, and glued box blank 10". By permanently positioning an array of marking units (e.g., spray nozzles) spaced to mark (e.g., spray) a packaging product at different locations along one or more sides or edges based on the receipt of a simple activation signal, the rate of uniquely marking the packaging product can be greatly increased to accommodate machinery with high throughput.

Although shown and described in terms of an optical camera and/or light projection, the sensors of the systems and methods disclosed herein may include other imaging and/or sensing technologies, such as LED, laser, thermal, infrared (IR), HDR, time-of-flight (TOF), triangulating, point cloud, line-scan, flying spot, three-dimensional (3D), stereo-temporal, angular encoding, photo-, charge-coupled device (CCD), complementary metal-oxide-semiconductor (CMOS), liquid lens, monochrome, and/or global electronic shutter sensors, for example.

Although shown and described in terms of sprayers, the markers of the systems and methods disclosed herein may include other manners of marking the packaging products (e.g., printer, laser, stamp, projector, electrostatic device, cutter, needle). In some embodiments, the marking device and/or apparatus may utilize a type of non-contact marking. Embodiments of systems with non-contact marking may benefit from more precise and/or faster rates of marking. In some embodiments, the marking apparatus may be non-destructive to the packaging product. In some embodiments, the marking apparatus may be destructive. For example, the marking apparatus may punch holes or cut the edges in a portion of the packaging product, which may be not visible or nearly invisible when the packaging product is assembled or erected. Thus, the marking systems and methods may be configured in various alternative ways to cause detected defects in packaging products to be easily and readily identifiable.

The disclosed systems and methods may be used with additional or alternative converting machinery depending on the desired packaging product design. With reference to FIG. 4, a box blank 10' may include multiple panels (e.g., bottom right panel 12, bottom left panel 18) with flaps (e.g., side flap 15) extending therefrom and score lines 25 in between. In the disclosed quality defect marking systems and methods, the score lines 25 may be measured via the score sensor 152, for example. A slot depth 35 may be measured from the edge of a top/bottom flap to the side flap 15 (e.g., via slot depth sensor 153). Further, the placement of glue 45 on the side flap 15 may be measured via the glue sensor 154, for example.

Using the folder-joiner 128, the bottom left panel 18 and bottom right panel 12 may be folded underneath the top left panel 14 and the top right panel 16, and the side flap 15 may be glued to the inside of the bottom right panel 12, as shown in FIG. 5. FIG. 6 shows the underside of the folded and glued box blank 10" shown in FIG. 5, illustrating the bottom left panel 18 joined with the bottom right panel 12 to form a fold 55 and a gap 65.

FIG. 7 shows the underside of the box blank 10' of FIG. 4 that has been misfolded to form a defective folded and glued box blank 10". The defective fold 55 may be measured via the misfold sensor 356, and the misaligned gap 65 may be measured via the gap sensor 357. Further the visibility of the side flap 15 and the glue 45 may be measured via the misfold sensor 356 and/or the gap sensor 357. In response to these defects being detected by the system 300, the controller 310 may trigger the second defect marker (e.g., sprayer 382) and the third defect marker (e.g., sprayer 384) in the defect marker array (e.g., sprayer array 388) to both mark (e.g., spray) the folded and glued box blank 10" to indicate these defects. In some embodiments, the system 300 may be programmed with a hierarchy for defect marking. For example, if three different types of defects are detected in a packaging product, the system 300 may only mark the top or top two defect types in the hierarchy. In some embodiments, the system 300 may include multiple defect marker arrays (e.g., sprayer arrays), each with its own designated color. For example, each defect marker array (e.g., sprayer array) may mark (e.g., spray) the packaging product at two or more different locations to indicate three specific defects based on the location of the mark (e.g., left spray mark, right spray mark, both left and right spray marks) as well as the defect type based on the color of the marking material (e.g., spray). Further variations are possible.

FIG. 8 illustrates the side of a bundle 20 that has been ejected by the bundle ejector 160 to the ejection offshoot area due to detected defects in at least one of the folded and glued box blanks 10" of the bundle 20. The UV light box 162 may illuminate the UV ink in the marks applied to the edge of folded and glued box blanks 10" within the bundle 20. For example, as shown in FIG. 8, the 8th folded and glued box blank 10" from the top and the 5th folded and glued box blank 10" from the bottom have been marked. An operator may quickly see that those two boxes need to be removed from the bundle. Further, the marks may indicate that the 8th box down has both a glue-type defect (e.g., via a blue color and/or solid pattern) and a fold-type defect (e.g., via a green color and/or crisscrossed pattern), and that the 5th box up has only a glue-type defect. Thus, the operator knows to only inspect the glue on the 5th box up if double-checking the defects. Moreover, the appearance of multiple glue-type defects may alert the operator to a possible problem with the gluer, such that the operator may be on the look-out for additional glue-type defect marks and/or take steps to adjust the gluer.

Although not shown, the systems and methods disclosed may detect and mark other types of defects, such as perforation-type defects, damage-type defects, and/or stray mark-type defects, for example.

Example Flowchart(s)

Embodiments of the present disclosure provide methods and systems for marking quality defects in packaging products as they are processed. In this regard, associated systems and methods for detecting and marking quality defects described herein are contemplated by some embodiments of the present disclosure. Such systems and methods may include various machines and devices, including for example box forming devices (e.g., for folding, gluing, and/or taping boxes, among other things) and/or corrugators. In this regard, known corrugators utilize web product (e.g., liner) and flute medium to form corrugated web product (which may be formed into any number of layered corrugate, such as conventional corrugate (liner, flute medium, liner) or double-walled corrugate (liner, flute medium, liner, flute medium, and liner)). The formed corrugated web product may then be cut (e.g., scored, sliced, perforated, etc.) as needed to form a blank of the desired box assembly portion (e.g., any of the box assembly designs described herein). An example corrugator is further described in U.S. Publication No. 2019/0016081, which was filed Jul. 12, 2018, and entitled "Controls for Paper, Sheet, and Box Manufacturing Systems", the contents of which is incorporated by reference herein in its entirety.

Various examples of the operations performed in accordance with some embodiments of the present disclosure will now be provided with reference to FIGS. 9-11. In this regard, FIGS. 9-11 each illustrate a flowchart according to an example method for detecting and marking quality defects according to example embodiments 600, 700, 800. The operations illustrated in and described with respect to FIGS. 9-11 may, for example, be performed by, with the assistance of, and/or under the control of a user and/or a machine for performing the operation (e.g., as described herein with regard to the process steps within the converting machines).

Operation 602 may comprise detecting whether a first type of defect is present in a packaging product by sensing data corresponding to a first type of potential defect in the processing of the packaging product (e.g., via the score sensor 152 and/or the slot depth sensor 153). Operation 604 may comprise triggering a first defect marker to mark the packaging product, in which the first type of defect was detected (e.g., via the first defect sprayer 182).

Operation 606 may comprise detecting whether a second type of defect is present in a packaging product by sensing data corresponding to a second type of potential defect in the processing of the packaging product (e.g., via the glue sensor 154). Operation 608 may comprise triggering a second defect marker to mark the packaging product, in which the second type of defect was detected (e.g., via the second defect sprayer 184). Operations 604, 606, and 608 may be performed in any order.

Operation 610 may include triggering a third marker to mark the bundle of package products (e.g., via the bundle sprayer 186) due to detecting either of the first type of defect and/or the second type of defect. In some embodiments, operation 610 may be optional. For example, marking a bundle may not be necessary where a packaging product can be individually rejected and/or where the packaging products are not bundled or stacked.

Likewise, with reference to FIG. 10, operation 702 may comprise detecting a first type of defect in a packaging product by sensing data corresponding to a first type of potential defect in the processing of the packaging product (e.g., via the score sensor 152 and/or the slot depth sensor 153). Operation 704 may comprise detecting a second type of defect in a packaging product by sensing data corresponding to a second type of potential defect in the processing of the packaging product (e.g., via the glue sensor 154). Operations 702 and 704 may be performed in any order.

Operation 706 may comprise triggering a first defect marker to mark the packaging product, in which the first type of defect was detected (e.g., via the first defect sprayer 182). Operation 708 may comprise triggering a second defect marker to mark the packaging product, in which the second type of defect was detected (e.g., via the second defect sprayer 184). Operations 706 and 708 may be performed in any order (e.g., operation 706 may be performed before operation 704).

Operation 710 may include triggering a third marker to mark the bundle of packaging products (e.g., via the bundle sprayer 186) due to detecting either of the first type of defect and/or the second type of defect.

With reference to FIG. 11, operation 802 may comprise detecting a first type of defect in a packaging product by sensing data corresponding to a first type of potential defect in the processing of the packaging product (e.g., via the score sensor 152 and/or the slot depth sensor 153). Operation 804 may comprise detecting a second type of defect in a packaging product by sensing data corresponding to a second type of potential defect in the processing of the packaging product (e.g., via the glue sensor 154). Operations 802 and 804 may be performed in any order.

Operation 806 may comprise triggering a first defect marker to mark the packaging product, in which the first type of defect was detected (e.g., via the first defect sprayer 381) and triggering a second defect marker to mark the packaging product, in which the second type of defect was detected (e.g., via the second defect sprayer 382), where the first and second defect markers are within a marker array (e.g., the defect sprayer array 388).

Operation 808 may include triggering a third marker to mark the bundle of packaging products (e.g., via the bundle sprayer 386) due to detecting either of the first type of defect and/or the second type of defect.

Conclusion

Many modifications and other embodiments set forth herein may come to mind to one skilled in the art to which this disclosure pertains having the benefit of the teachings presented in the foregoing descriptions and the associated drawings. Therefore, it is to be understood that the embodiments of the present disclosure are not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated within the scope of the present disclosure. Although specific terms are employed herein, they are used in a generic and descriptive sense only and not for purposes of limitation.

What is claimed is:

1. A quality defect marking system for manufacturing a packaging product, the system comprising:
   a first sensor positioned along a processing pathway for the packaging product and configured to sense data corresponding to a first type of potential defect in the manufacture of the packaging product;
   a second sensor positioned along the processing pathway and configured to sense data corresponding to a second type of potential defect in the manufacture of the packaging product, wherein the second type of potential defect is different than the first type of potential defect;
   a defect marker positioned along the processing pathway, downstream of the first sensor and the second sensor, wherein the defect marker comprises an array of marking elements configured to mark a same edge of the packaging product; and
   a controller configured to:
   receive the data corresponding to the first type of potential defect sensed by the first sensor,
   process the data corresponding to the first type of potential defect to detect whether a first-type defect in the packaging product is present,
   receive the data corresponding to the second type of potential defect sensed by the second sensor,
   process the data corresponding to the second type of potential defect to detect whether a second-type defect in the packaging product is present,
   trigger the defect marker to mark the packaging product with a first-type marking in response to detecting the first-type defect in the packaging product,
   trigger the defect marker to mark the packaging product with a second-type marking in response to detecting the second-type defect in the packaging product,
   wherein the first-type marking corresponding to the first-type defect is different than the second-type marking corresponding to the second-type defect, and
   trigger both a first marking element to create the first-type marking in response to detecting the first-type defect and a second marking element to create the second-type marking in response to detecting the second-type defect so as to indicate occurrence of both the first-type defect and the second-type defect.

2. The system of claim 1, wherein the first marking element is configured to spray the packaging product in a different location than the second marking element along the same edge of the packaging product.

3. The system of claim 1, wherein:
   the data corresponding to the first type of potential defect is data from one of a score measurement, a slot depth measurement, a glue measurement, a fold measurement, and a gap measurement, and
   the data corresponding to the second type of potential defect is data from another of the score measurement, the slot depth measurement, the glue measurement, the fold measurement, and the gap measurement.

4. The system of claim 1, wherein the defect marker comprises one or more sprayers.

5. The system of claim 4, wherein:
   a first defect sprayer of the defect marker is configured to spray the packaging product with a first spray,
   a second defect sprayer of the defect marker is configured to spray the packaging product with a second spray, and
   the first spray is a different color than the second spray.

6. The system of claim 4, wherein at least one of the one or more sprayers of the defect marker is configured to spray a UV spray.

7. The system of claim 1, wherein at least one of the first sensor and the second sensor includes an optical image camera.

8. The system of claim 1, wherein the defect marker is configured to be triggerable by the controller to mark packaging products moving along the processing pathway in a range of about 200 to about 600 packaging products per minute.

9. A quality defect marking system for manufacturing a packaging product, the system comprising:
   a first sensor positioned along a processing pathway for the packaging product and configured to sense data corresponding to a first type of potential defect in the manufacture of the packaging product;
   a first defect marker positioned along the processing pathway, downstream of the first sensor;
   a second sensor positioned along the processing pathway and configured to sense data corresponding to a second type of potential defect in the manufacture of the packaging product, wherein the second type of potential defect is different than the first type of potential defect;
   a second defect marker positioned along the processing pathway, downstream of the second sensor; and
   a controller configured to:
   receive the data corresponding to the first type of potential defect sensed by the first sensor,
   process the data corresponding to the first type of potential defect to detect whether a first-type defect in the packaging product is present,
   trigger the first defect marker to mark the packaging product with a first-type marking in response to detecting the first-type defect in the packaging product;
   receive the data corresponding to the second type of potential defect sensed by the second sensor,
   process the data corresponding to the second type of potential defect to detect a second-type defect in the packaging product,
   trigger the second defect marker to mark the packaging product with a second-type marking in response to detecting the second-type defect in the packaging product, and
   trigger both the first defect marker to create the first-type marking in response to detecting the first-type defect and the second defect marker to create the second-type marking in response to detecting the second-type defect so as to indicate occurrence of both the first-type defect and the second-type defect,
   wherein the first-type marking corresponding to the first-type defect is different than the second-type marking corresponding to the second-type defect, and
   wherein the first defect marker and the second defect marker are configured to mark a same edge of the packaging product.

10. The system of claim 9, wherein the controller is configured to trigger the first defect marker and the second defect marker simultaneously.

11. The system of claim 9, wherein the controller is further configured to:
- generate a first trigger time to trigger the first defect marker based on a first sense time when the data corresponding to the first type of potential defect in the processing of the packaging product was sensed by the first sensor, and
- generate a second trigger time to trigger the second defect marker based on a second sense time when the data corresponding to the second type of potential defect in the processing of the packaging product was sensed by the second sensor.

12. The system of claim 9, wherein the controller is further configured to:
- generate a first trigger time to trigger the first defect marker based on a first receipt time when the data corresponding to the first type of potential defect in the processing of the packaging product was received, and
- generate a second trigger time to trigger the second defect marker based on a second receipt time when the data corresponding to the second type of potential defect in the processing of the packaging product was received.

13. The system of claim 9, wherein:
- the data corresponding to the first type of potential defect is data from one of a score measurement, a slot depth measurement, a glue measurement, a fold measurement, and a gap measurement, and
- the data corresponding to the second type of potential defect is data from another of the score measurement, the slot depth measurement, the glue measurement, the fold measurement, and the gap measurement.

14. The system of claim 9, wherein at least one of the first defect marker and the second defect marker comprises a sprayer.

15. The system of claim 14, wherein:
- the first defect marker is configured to spray the packaging product with a first spray,
- the second defect marker is configured to spray the packaging product with a second spray, and
- the first spray is a different color than the second spray.

16. A method of marking quality defects in manufacturing a packaging product, the method comprising:
- sensing data corresponding to a first type of potential defect in the manufacture of the packaging product via a first sensor;
- sensing data corresponding to a second type of potential defect in the manufacture of the packaging product via a second sensor;
- processing the data corresponding to the first type of potential defect to detect whether a first-type defect in the packaging product is present;
- processing the data corresponding to the second type of potential defect to detect whether a second-type defect in the packaging product is present; and
- triggering a defect marker to mark the packaging product with at least one of a first-type marking and a second-type marking in response to detecting at least one of the first-type defect and the second-type defect in the packaging product, wherein the defect marker comprises an array of marking elements configured to mark a same edge of the packaging product, and wherein the first-type marking is different than the second-type marking, wherein the triggering comprises triggering both a first marking element to create the first-type marking in response to detecting the first-type defect and a second marking element to create the second-type marking in response to detecting the second-type defect so as to indicate occurrence of both the first-type defect and the second-type defect.

17. The method of claim 16, wherein:
- the data corresponding to the first type of potential defect is data from one of a score measurement, a slot depth measurement, a glue measurement, a fold measurement, and a gap measurement, and
- the data corresponding to the second type of potential defect is data from another of the score measurement, the slot depth measurement, the glue measurement, the fold measurement, and the gap measurement.

18. The method of claim 16, wherein the defect marker comprises one or more sprayers.

19. The method of claim 18, wherein:
- the defect marker is configured to spray the packaging product with a first spray as part of the first-type marking corresponding to the first-type defect,
- the defect marker is configured to spray the packaging product with a second spray as part of the second-type marking corresponding to the second-type defect, and
- the first spray is a different color than the second spray.

20. The method of claim 16, wherein the defect marker is configured to mark the packaging product in a non-destructive manner.

21. The method of claim 20, wherein the non-destructive manner is marking the packaging product with fluorescing pigment.

* * * * *